(12) United States Patent
Takeuchi et al.

(10) Patent No.: US 6,417,488 B1
(45) Date of Patent: Jul. 9, 2002

(54) INTERNAL METAL PIPE WELDING APPARATUS AND MONITORING SYSTEM

(75) Inventors: Yuko Takeuchi; Hitoshi Hayakawa; Masaki Tsuchiya, all of Aichi (JP)

(73) Assignee: Daido Tokushuko Kabushiki Kaisha (JP)

( * ) Notice: Subject to any disclaimer, the term of this patent is extended or adjusted under 35 U.S.C. 154(b) by 0 days.

(21) Appl. No.: 09/574,200

(22) Filed: May 19, 2000

(30) Foreign Application Priority Data

May 20, 1999 (JP) .......................................... 11-139971
Feb. 29, 2000 (JP) .......................................... 12-053054

(51) Int. Cl.[7] ............................................. B23K 9/095
(52) U.S. Cl. ................................. 219/130.01; 219/60 R
(58) Field of Search ...................... 219/130.01, 130.21, 219/124.34, 61, 60 A, 76.1, 76.11, 76.14, 74, 158, 60 R, 125.11

(56) References Cited

U.S. PATENT DOCUMENTS

| | | | | |
|---|---|---|---|---|
| 2,187,786 A | * | 1/1940 | Jacobus ........................ 219/61 |
| 2,818,083 A | * | 12/1957 | Jelm ........................... 219/158 |
| 2,945,943 A | * | 7/1960 | Meyer ........................... 219/74 |
| 3,209,119 A | * | 9/1965 | Keidel et al. .............. 219/60 A |
| 3,496,327 A | * | 2/1970 | Vilkas ..................... 219/130.21 |
| 4,242,981 A | * | 1/1981 | Bernard et al. ............ 219/76.1 |
| 4,698,484 A | * | 10/1987 | Babcock et al. ........ 219/130.01 |
| 5,442,155 A | * | 8/1995 | Nihei et al. ............. 219/130.01 |
| 6,060,678 A | * | 5/2000 | Allford ........................ 219/61 |
| 6,084,205 A | * | 7/2000 | Sheaffer et al. ........ 219/130.21 |

* cited by examiner

*Primary Examiner*—Clifford C. Shaw
(74) *Attorney, Agent, or Firm*—Bacon & Thomas, PLLC

(57) ABSTRACT

A metal pipe inner surface weld-mounting apparatus having a monitoring device is constituted by an arm, a horizontal torch, a mirror, a camera and a monitoring device. The arm has a supported base end portion, which is horizontally extended. The horizontal torch is attached to a leading end portion of the arm. The weld-mounting is performed on an inner surface portion of a metal pipe supported rotatably around a horizontally extending axis while at least one of the metal pipe and the horizontal torch is moved in a direction of the axis. The mirror is attached to the leading end portion of the arm. The camera is disposed in a position separated from the mirror for picking up an image of weld-mounting beads in a neighborhood of arc light of the horizontal torch through the mirror. The monitoring device monitors a condition of the weld-mounting.

23 Claims, 8 Drawing Sheets

INTERNAL METAL PIPE WELDING APPARATUS AND MONITORING SYSTEM

BACKGROUND OF THE INVENTION

1. Field of the Invention

The present invention relates to an apparatus for depositing a material on an internal surface of a metal pipe, which is also known as weld-mounting, and particularly to a weld-mounting apparatus provided with a monitor device for monitoring the state of the weld-mounting.

2. Description of the Related Art

Steel pipes high in corrosion resistance and excellent in elosion resistance are required for petroleum production, petroleum transportation, etc. Therefore, in most cases, high-alloy powder is deposited or weld-mounted to the inner surface of the low-alloy steel pipes before the steel pipes are used.

These types of steel pipes have lengths ranging from 2 to 12 m. Consequently, it is difficult for an operator to confirm and monitor the weld-mounting of an inner surface of each pipe by a weld-mounting apparatus. Therefore, after weld-mounting, the pipes are inspected for defects by eye observation using an endoscope to evaluate products. In the inspection, it is very difficult to accurately specify positions of weld-mounting defects and repair the defects. As a result, products having detected defects are regarded as inferior products. This results in an increase in the cost of production and delay in the time of delivery.

SUMMARY OF THE INVENTION

It is an object of the present invention to provide a metal pipe inner surface weld-mounting apparatus having a monitoring device capable of finding the occurrence of failure such as abnormality of weld-mounting beads, abnormality of arc light, or the like, in a weld-mounting operation and taking an early countermeasure against the failure to thereby prevent rejected products from being produced.

According to a first aspect of the present invention, an apparatus for weld-mounting a metal pipe internal surface having a monitoring device comprises;

- a horizontally extending arm having a supported base end and a leading end;
- a torch attached to a portion of said arm near said leading end of the arm, weld-mounting being performed on an internal surface of a metal pipe supported and rotatable about a horizontally extending axis while at least one of the metal pipe and the horizontal torch is moveable in a direction along the horizontal axis;
- a mirror attached at the leading end of the arm;
- a camera positioned in spaced apart relation to the mirror for picking up an image of weld-mounting beads in a vicinity of arc light of the horizontal torch through the mirror; and
- a monitoring device for monitoring a condition of the weld-mounting.

According to a second aspect of the present invention, in the apparatus of the first aspect, the monitoring device is a monitor which displays an output video signal of the camera as an image.

According to the second aspect, an image of the weld-mounting beads in the neighborhood of the arc light is picked up by the camera as a reflected image by the mirror, and displayed by the monitor. Hence, abnormality of the weld-mounting beads can be found immediately by observation with the monitor in a weld-mounting operation, so that a necessary countermeasure can be taken.

According to a third aspect of the present invention, in the apparatus of the second aspect, the camera picks up an image of the arc light, on one and the same screen, as well as the image of the weld-mounting beads.

According to the third aspect, the reflected image of the weld-mounting beads and an image of the arc light are displayed on one and the same screen by the monitor. Hence, abnormality of the weld-mounting beads and abnormality of the arc light can be found immediately by observation with the monitor in a weld-mounting operation, so that a necessary countermeasure can be taken.

According to a fourth aspect of the present invention, in the apparatus of the first aspect, the monitoring device is an image processing unit for making a judgment, on the basis of an output video signal of the camera, as to whether weld-mounting is good or not.

According to the fourth aspect, the image of the weld-mounting beads in the neighborhood of the arc light is picked up by the camera as an image reflected by the mirror so as to be used for making a judgment as to whether weld-mounting is good or not by the image processing unit on the basis of the output video signal of the camera. Hence, abnormality of weld-mounting can be found immediately on the basis of the judgment output of the image processing unit in a weld-mounting operation, so that a necessary countermeasure can be taken.

According to a fifth aspect of the present invention, in the apparatus of the fourth aspect, the camera picks up an image of the arc light, on one and the same screen, as well as the image of the weld-mounting beads.

According to the fifth aspect, the image processing unit makes a judgment as to whether weld-mounting is good or not on the basis of the video signal of the reflected image of the weld-mounting beads and the video signal of the arc light. Hence, abnormality of the weld-mounting beads and abnormality of the arc light can be found immediately on the basis of the judgment output of the image processing unit in a weld-mounting operation, so that a necessary countermeasure can be taken.

In the present invention, a suitable filter can be used for the camera. According to a sixth aspect of the present invention, in the apparatus of the first to fifth aspects, if a filter for attenuating the arc light relatively greatly compared with light incident on the camera from the weld-mounting beads is provided between the mirror and the camera, the difference in brightness between the image of the weld-mounting beads and the image of the arc light formed on an image pick-up surface portion of the camera can be reduced so that the two images can be picked up as sharp images desirably.

In the present invention, any special cooling unit need not be additionally provided in the metal-pipe. According to the seventh aspect of the present invention, in the apparatus of the first to sixth aspects, if a cooling unit for circulating a cooling fluid is provided on an outer circumferential portion of the metal pipe, the quantity of bending of the metal pipe due to the influence of heat can be suppressed even in the case where the quantity of heat inputted by the arc light is large. Hence, the image reflected from the mirror can be prevented from being displaced out of the screen because of the change of the distance between the mirror and the inner surface of the metal pipe. Hence, this is desirable because fine adjustment of the upper and lower positions of the camera and the angle of the optical axis need not be repeated.

In the present invention, any special cooling unit need not be provided on the mirror. According to the eighth aspect of the present invention, in the apparatus of the first to seventh aspects, if a mirror cooling unit for circulating a gas for cooling a light-receiving surface of the mirror is provided on the light-receiving surface side of the mirror, the light-receiving surface of the mirror can be prevented from being melted and damaged by heat radiated from the high-temperature arc light or the high-temperature weld-mounting metal portion. Hence, the reflected image of the weld-mounting beads can be picked up, as an always sharp image, by the camera desirably.

The present invention can be applied to an apparatus for weld-mounting an inner surface of each of various types of metal pipes. According to the ninth aspect of the present invention, in the apparatus of the first to eighth aspects, if the metal pipe is a steel pipe, there can be obtained a monitor-containing steel pipe inner surface weld-mounting apparatus which is particularly suitable and greatly effective for weld-mounting on a steel pipe for petroleum production, petroleum transportation, etc. requiring weld-mounting on a large deal of long steel pipe.

PREFERRED EMBODIMENTS OF THE INVENTION

Figure 1:
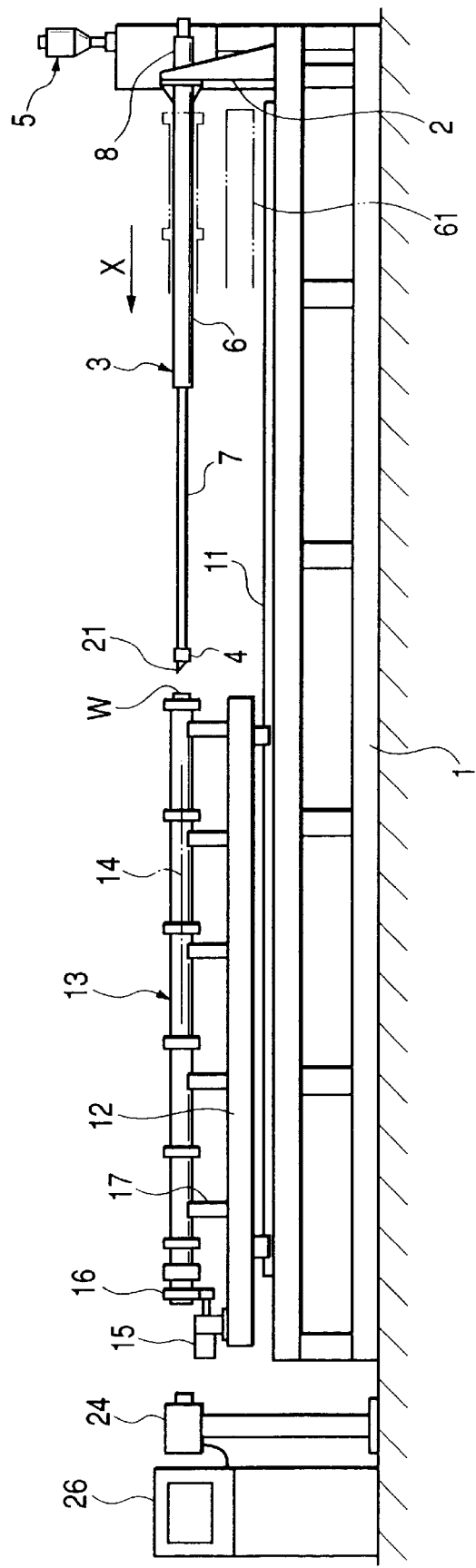
FIG. 1 is a front view of a steel pipe inner surface weld-mounting apparatus showing a first embodiment of the present invention.

A first embodiment of the present invention will be described below with reference to FIGS. 1 to 5. FIG. 1 shows the whole of an apparatus. A base end portion of a horizontally extending arm 3 is fixed and supported by a frame 2 erected at an end portion of a base 1. A horizontal torch 4 for performing weld-mounting is attached to a leading end portion of the arm 3. The horizontal torch 4 generates a plasma arc to melt hard alloy powder (hastelloy in this embodiment) to perform the weld-mounting on an inner surface of a steel pipe W which is a metal pipe. Powder material and gas necessary for the weld-mounting are supplied from a material supply portion 5. Further, the arm 3 is of a telescopic type in which an inner cylinder member 7 is axially movably fitted into an outer cylinder member 6. The reference numeral 8 designates a motor for driving the inner cylinder member 7 telescopically.

A truck 12 is horizontally movably put on rails 11 laid on the base 1. A cylindrical cooling unit 13 in which the steel pipe W as a metal pipe to be subjected to weld-mounting is supported concentrically in the its diameter side is supported on the truck 12 so as to be rotatable around a horizontally extending axis 14. The reference numeral 15 designates a motor for driving the cooling unit 13 to rotate through a gear 16. Further, support rollers 18 (see FIG. 3) for supporting an outer circumferential portion of an outer cylinder 35 of the cooling unit 13 are attached to props 17 erected from the truck 12.

Incidentally, the aforementioned basic configuration is the same as that described in a Japanese Utility Model Registration Gazette for Japanese Utility Model Registration No. 2504954. The structure described in the above gazette can be used as a detailed structure for a guide unit between the arm 3 and an inner circumferential surface of the steel pipe W, a support unit for supporting the inner cylinder member 7 of the arm 3 to be concentric with the outer cylinder member 6, and so on.

Figure 2:
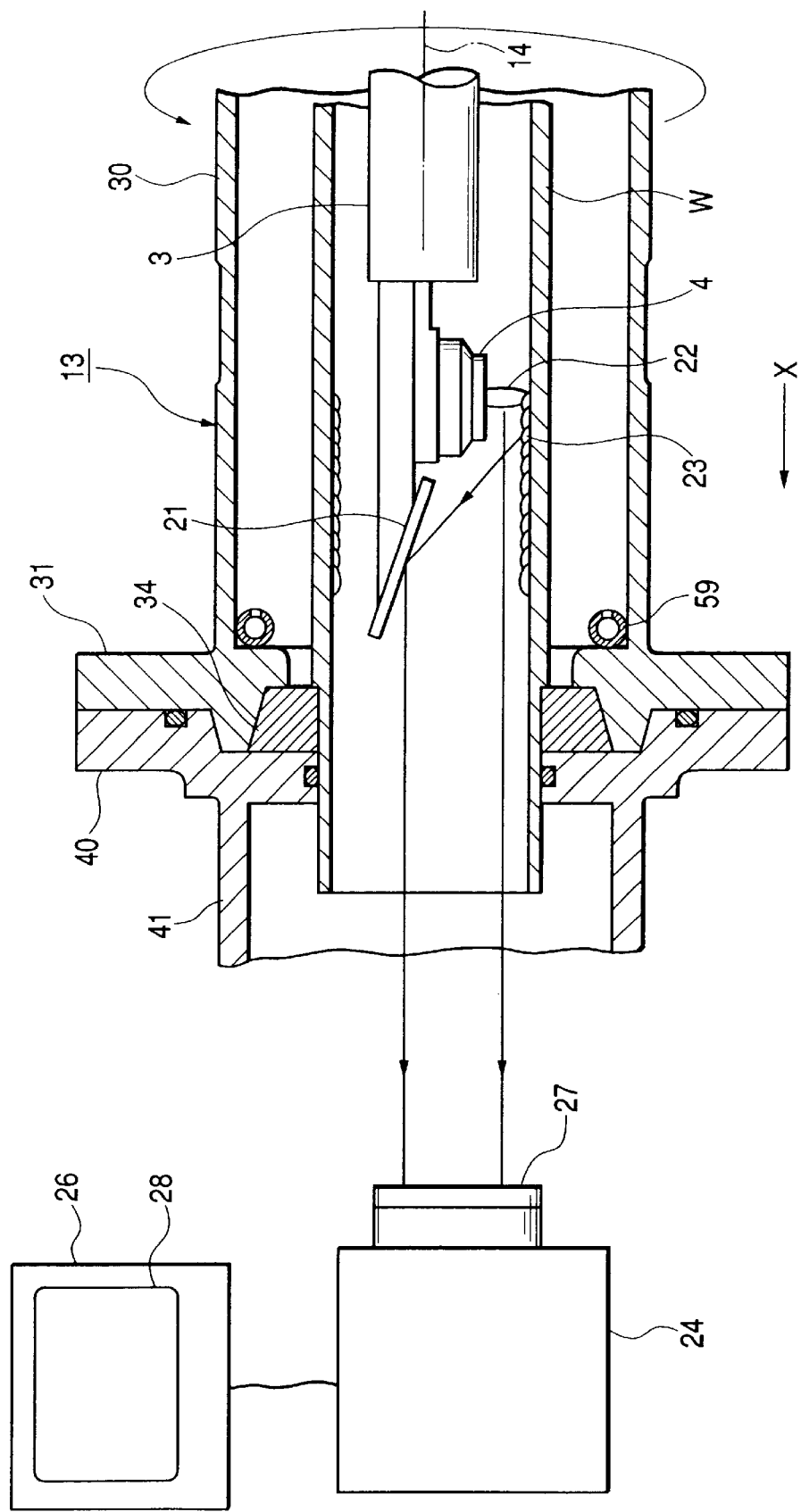
FIG. 2 is an enlarged vertical sectional view of a main part showing a state of weld-mounting and image picking-up in the apparatus depicted in FIG. 1.

As shown in detail in FIG. 2, a mirror 21 is attached to the leading end portion of the arm 3. The mirror 21 is attached in the neighborhood of the horizontal torch 4 and in a position of the arm leading end side (CCD camera 24 side) ahead of the horizontal torch 4. The setting angle of the mirror 21 is adjusted so that an image of weld-mounting beads 23 subjected to weld-mounting in the neighborhood of arc light 22 of the horizontal torch 4 is reflected to be outputted horizontally.

A CCD camera 24 is disposed in a position separated from the mirror 21 but near to the other end portion of the base 1. In this embodiment, the upper and lower positions and optical axis angle of the CCD camera 24 are adjusted so that the CCD camera 24 can directly pick up an image of the arc light 22 of the horizontal torch 4 together with the image 25 (see FIG. 5) of the weld-mounting beads 23 reflected by the mirror 21. The reference numeral 26 designates a monitor for visualizing an output video signal of the CCD camera 24 and displaying the visualized signal. The reference numeral 27 designates a filter attached to the front side of a lens of the CCD camera. The filter 27 attenuate, to a proper value, the quantity of light of the arc light 22, and so on, which reaches a light-receiving portion of the CCD camera 24.

Figure 3:
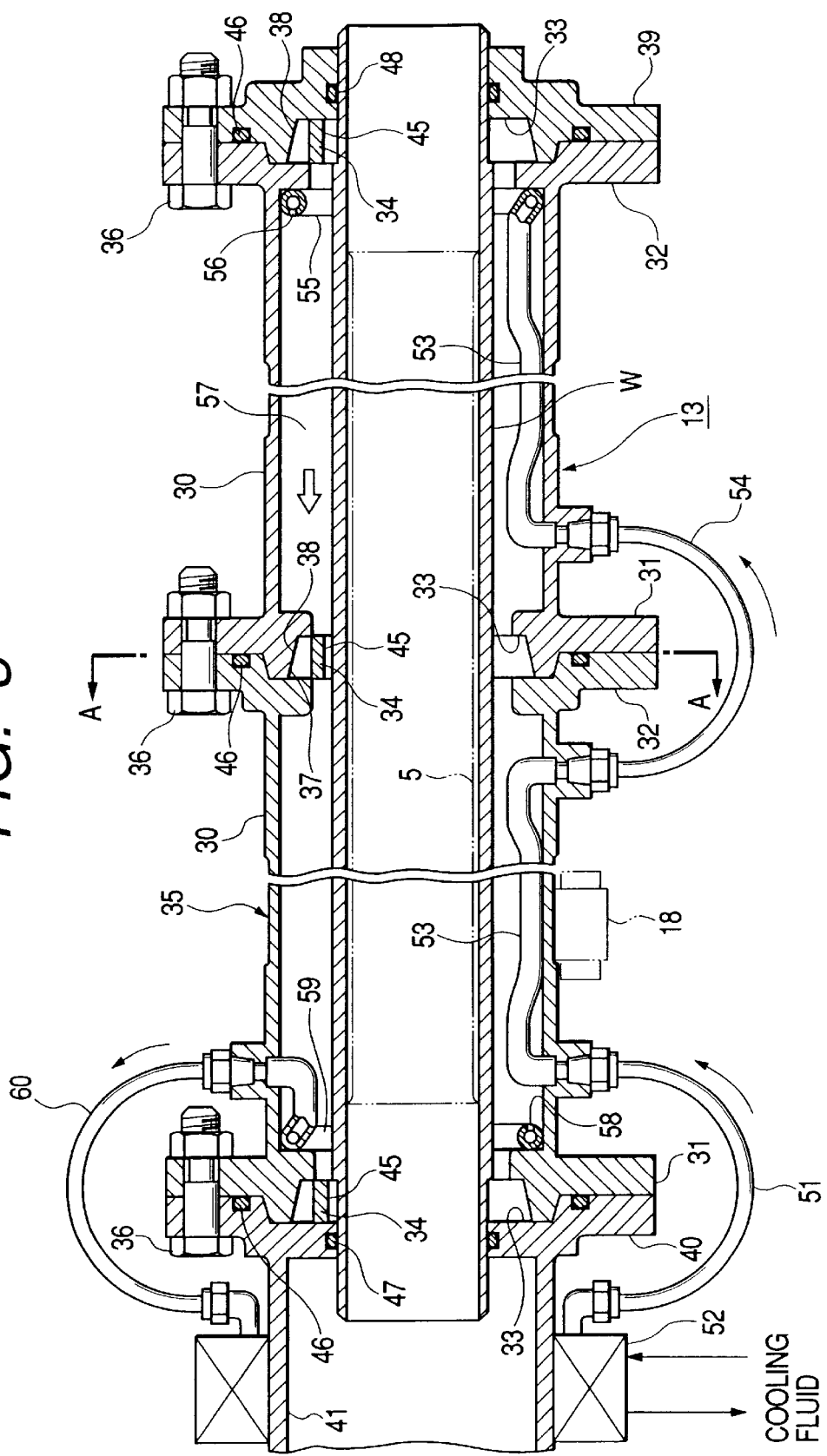
FIG. 3 is a vertical sectional view of a cooling unit in the apparatus depicted in FIG. 1.

Further, the cooling unit 13 is configured in the same manner as described in the above Japanese Utility Model Registration official gazette. As shown in FIG. 3, the cooling unit 13 has: a plurality of outer cylinder pipes 30 each having first and second flanges 31 and 32 at its opposite ends respectively; annular support members 34 held in annular grooves 33 formed between the first and second flanges 31 and 32 and for supporting the steel pipe W; and bolts and nuts 36 by which the first and second flanges 31 and 32 are held to connect the plurality of outer cylinder pipes 30 to one another in the longitudinal direction of the outer cylinder pipes so that a long outer cylinder 35 is formed.

Figure 4:
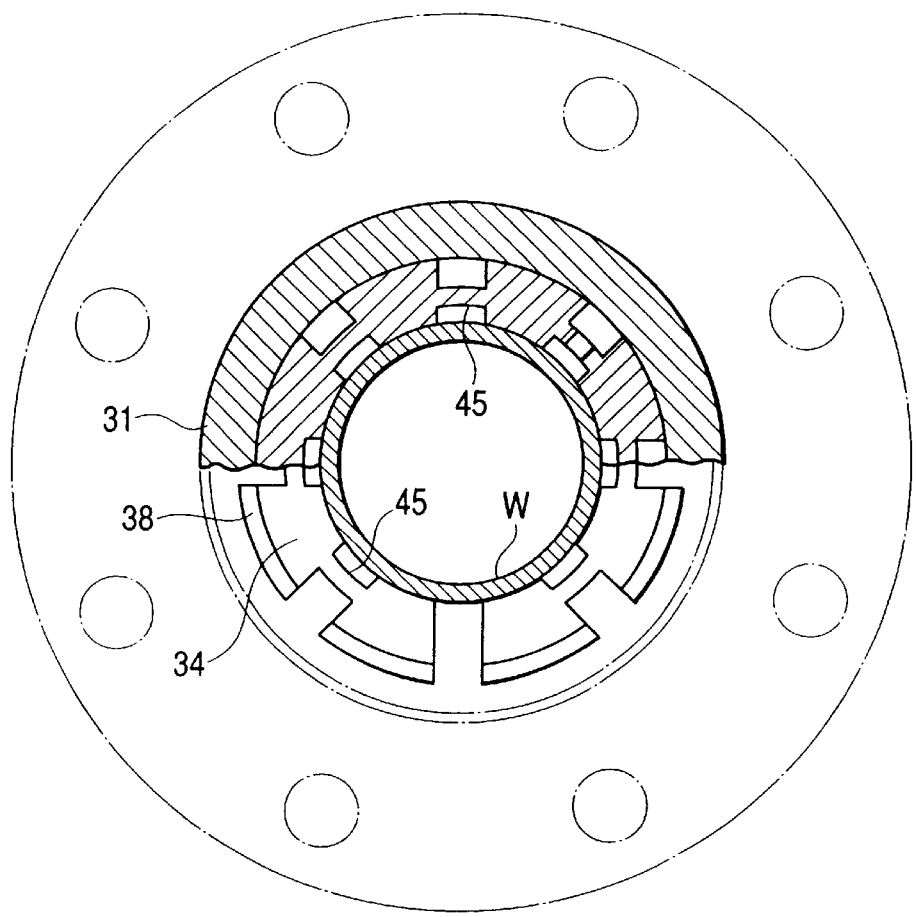
FIG. 4 is a sectional view taken along the line A—A in FIG. 3.

As shown also in FIG. 4, each of the annular support members 34 is a C-shaped ring which is made of a metal such as copper, stainless steel, or the like, and which has a tapered outer circumferential surface 38 touching a tapered bottom surface 37 of corresponding one of the annular grooves 33. With fastening of the bolts and nuts 36, the diameter of each of the annular support members 34 is reduced by the sliding action of the two surfaces 37 and 38 so that the outer circumferential surface of the steel pipe W is supported in a plurality of regions. Further, a third flange 39 is fastened to the second flange 32 at an arm 3 side end portion of the outer cylinder 35. Further, a fourth flange 40 having a cylindrical portion 41 protruded toward the motor 15 is fastened to the first flange 31 at a motor 15 side end portion of the outer cylinder 35. The annular support members 34 are held also in the annular grooves 33, respectively, formed between the second and third flanges 32 and 39 and between the first and fourth flanges 31 and 40. As shown also in FIG. 4, inner circumferential through-holes 45 for circulating a cooling fluid are formed in inner circumferential surfaces of the annular support members 34 respectively. The reference numerals 46, 47 and 48 designate O-rings for sealing respective portions.

A cooling fluid supply pipe 51 is connected, through a rotary joint 52, to a cooling fluid circulator not shown. The cooling fluid supply pipe 51 is successively series-connected to hoses 53 disposed in the outer cylinder pipes 30 respectively and to bypass hoses 54 for bypassing the first and second flanges 31 and 32. Thus, a cooling fluid is supplied to a fluid release ring 55 located in the arm 3 side end portion of the outer cylinder 35. The fluid release ring 55 has a plurality of release ports 56 from which the cooling fluid (water in this embodiment) is released to a circulatory space 57 formed between the outer cylinder 35 and the steel pipe W. A fluid suction ring 59 having a plurality of suction ports 58 for sucking the cooling fluid is provided in the motor 15 side end portion of the outer cylinder 35 so that the cooling fluid sucked by the fluid suction ring 59 is returned to the cooling fluid circulator via a cooling fluid return pipe 60 and the rotary joint 52.

To perform weld-mounting by the apparatus configured as described above, the cooling unit 13 supporting a new steel pipe W is put on the truck 12. After the rotary joint 52 is connected to the cooling fluid circulator, the whole length of the arm 3 is adjusted by the motor 8 in accordance with the length of the steel pipe W, specifically in accordance with the horizontal length of a weld-mounting region S to be applied to the inner surface of the steel pipe W. The truck 12 is moved forward to a position represented by the chain line 61 in FIG. 1. Thus, the horizontal torch 4 is positioned in the motor 15 side end portion of the weld-mounting region S. Then, a lens system is set to adjust the focus of the CCD camera 24 so that the image of the weld-mounting beads 23 reflected by the mirror 21 and the image of the arc light 22 are formed clearly on the light-receiving portion of the camera. Also in this case, the focus of the CCD camera 24 can be adjusted with a screen 28 of the monitor 26 watched if the filter 27 is removed.

Figure 5:
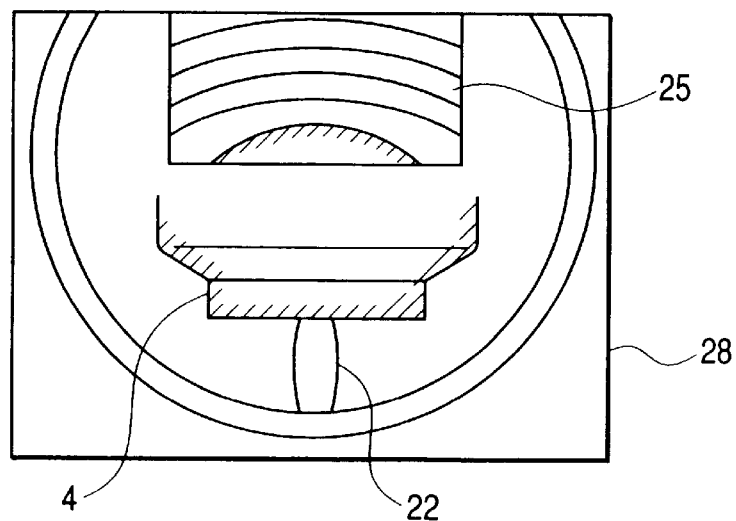
FIG. 5 is a display screen in a monitor at the time of image picking-up shown in FIG. 2.

After the setting, weld-mounting due to the horizontal torch 4 is started. At the same time, the steel pipe W integrated with the cooling unit 13 is driven to rotate around the axis 14 by the motor 15 and the truck 12 is driven to move in the direction of the arrow X at a low speed by a driver not shown. Thus, weld-mounting is performed on the inner surface of the steel pipe W. An image of the weld-mounting beads 23 subjected to weld-mounting in the neighborhood of the horizontal torch 4 is picked up by the CCD camera 24 as the image 25 reflected by the mirror 21, and then displayed on the screen 28 of the monitor 26 as shown in FIG. 5. At the same time, the image of the arc light 22 is displayed on the same screen.

If an abnormal state such as the irregular or undersize generation of the weld-mounting beads 23, the instability of the arc light 22, or the like, is found in the weld-mounting beads and the arc light when these images are monitored, the weld-mounting operation is interrupted. Inspection of the state of material supply from the material supply portion 5, the gas pressure, etc., pulling the horizontal torch 4 out of the steel pipe, inspection and cleaning of the horizontal torch 4, and so on, are performed and, if necessary, the undersized weld-mounting portion is repaired by reweld-mounting. Then, weld-mounting is restarted to be continued.

As described above, the abnormality of the weld-mounting beads 23 just after weld-mounting and the abnormality of the arc light 22 in the weld-mounting can be found immediately, so that the aforementioned countermeasure to eliminate the defects can be taken. Hence, inferior products can be prevented from being produced.

Moreover, in the cooling unit 13, the steel pipe W is cooled by a cooling fluid circulated in the circulatory space 57, so that the quantity of bending of the steel pipe W is suppressed. Hence, the reflected image 25 of the weld-mounting beads can be prevented from getting out of shape greatly on the screen 28 of the monitor 26. Moreover, the outer circumferential surface, particularly, of an intermediate portion of the steel pipe W is supported by the annular support members 34. Hence, the steel pipe W is prevented more securely from being bent.

Figure 6:
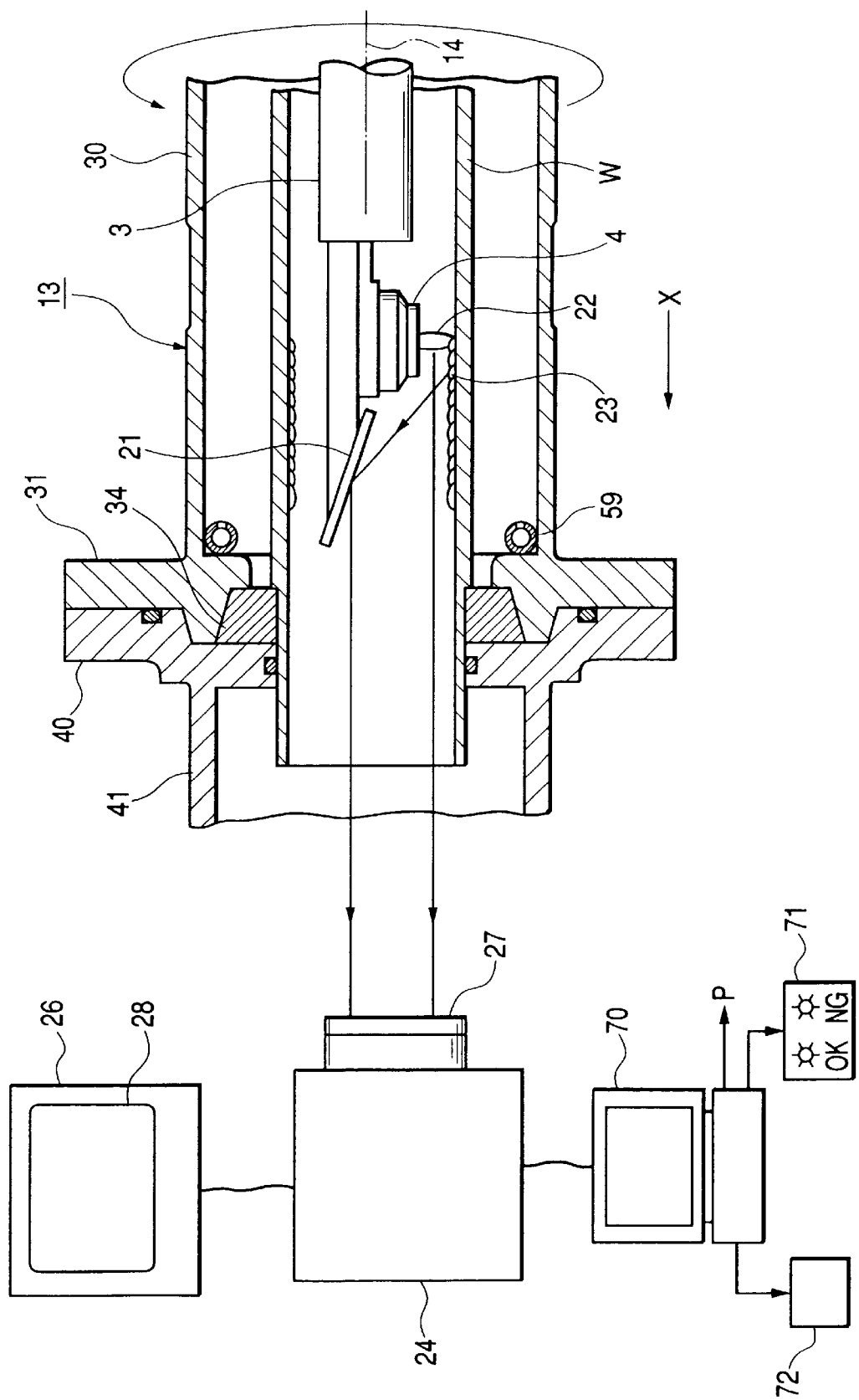
FIG. 6 is an enlarged vertical sectional view (equivalent to FIG. 2) of a main part showing a state of weld-mounting and image picking-up in a steel pipe inner surface weld-mounting apparatus showing a second embodiment of the present invention.

A second embodiment of the present invention will be described below with reference to FIGS. 6 and 7. In this embodiment, as shown in FIG. 6, the same monitor 26 as in the first embodiment is connected to the CCD camera 24 and an image processing unit 70 is newly connected also to the CCD camera 24 in order to perform a judgment, on the basis of the output video signal of the CCD camera 24, as to whether weld-mounting is good or not. The other configuration in the second embodiment is the same as in the first embodiment. Hence, parts identical to those in FIG. 2 are referenced correspondingly and the description of the identical parts is omitted. This rule will apply to other embodiments.

Figure 7:
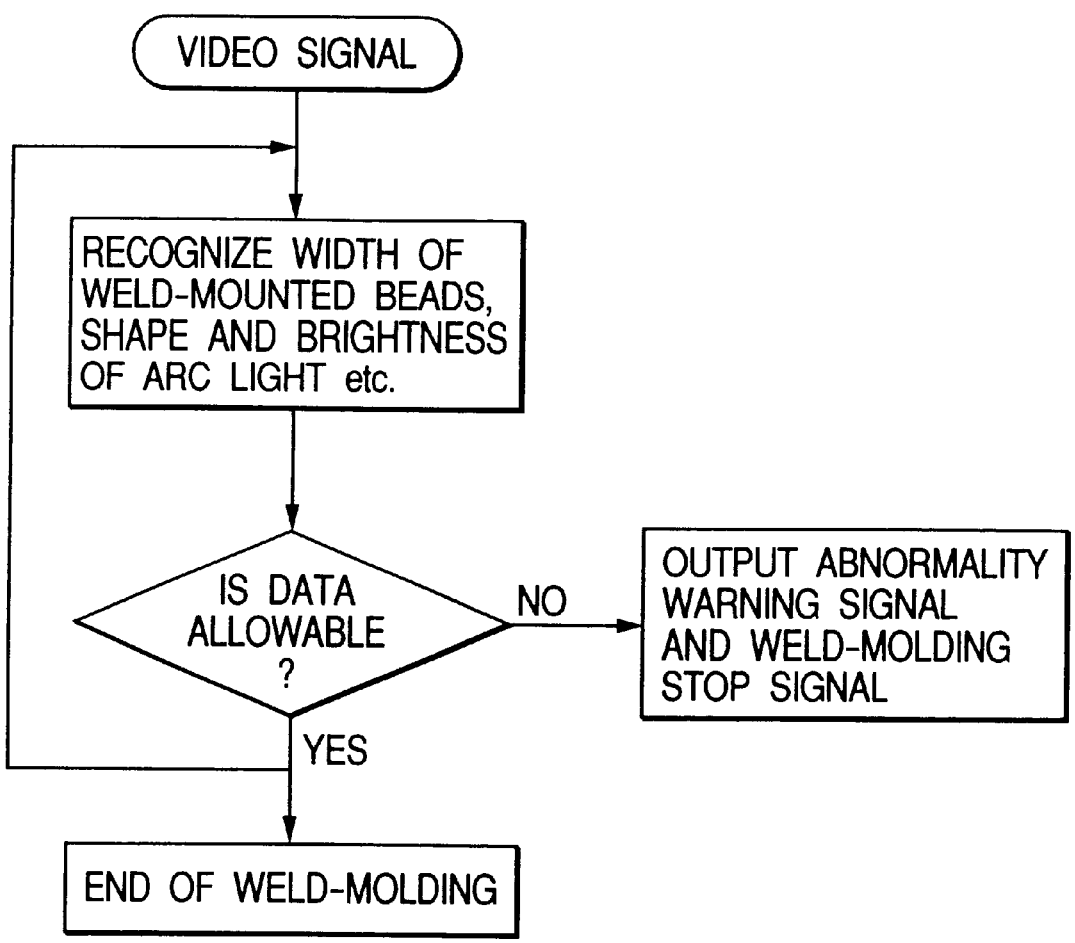
FIG. 7 is a flow chart showing a data processing process of an image processing unit in the apparatus depicted in FIG. 6.

As shown in FIG. 7, the image processing unit 70 has a circuit configuration which operates as follows. The image processing unit 70 recognizes objects to be monitored, such as the width of the weld-mounting beads 23, the shape and brightness of the arc light 22, etc., on the basis of the output video signal of the CCD camera 24, that is, on the basis of light density signals of respective image pick-up devices. Then, the image processing unit 70 compares the recognized data with allowable-range data which is preset and inputted in advance. As a result of comparison, the image processing unit 70 outputs an OK signal when the data is in the allowable range and an NG signal when the data is out of the allowable range.

The reference numeral 71 designates a pilot lamp which is turned on in accordance with the NG or OK signal. The NG signal is outputted as an abnormality warning signal to the pilot lamp 71 to turn an NG lamp on. At the same time, the NG signal is outputted as a weld-mounting stop signal P to a control portion of the weld-mounting apparatus. Incidentally, the pilot lamp 71 may be replaced by or used in combination with a warning buzzer, or the like, sounded only at the time of NG.

Further, the reference numeral 72 designates a recorder for recording the aforementioned judgment result. The recorder 72 is provided as occasion demands. Incidentally, a picked-up scene may be recorded directly in the recorder 72 or the monitor 26 may be connected not to the CCD camera 24 but to the output side of the image processing unit 70 so that the picked-up scene can be displayed by the monitor 26 through the image processing unit 70 without interposition of the recorder 72.

If weld-mounting by the horizontal torch 4 is performed while rotation drive of the steel pipe W, driving such as, movement drive of the truck 12 at a low speed, is performed by the apparatus configured as described above in the same manner as in the first embodiment, the image of the weld-mounting beads 23 and the image of the arc light 22 are picked up by the CCD camera 24 and displayed on the screen 28 of the monitor 26. Moreover, if abnormality such as the generation of undersized weld-mounting beads 23, the undersize or oversize of the arc light 22, or the like, occurs, the image processing unit 70 outputs an NG signal to turn on the NG lamp of the pilot lamp 71 and outputs a weld-mounting stop signal P to interrupt the weld-mounting operation automatically. After the interruption, a countermeasure to eliminate the defects may be taken in the same manner as in the first embodiment.

As described above, abnormality of the weld-mounting beads 23 and abnormality of the arc light 22 can be found immediately on the basis of the judgment output of the image processing unit 70, so that a necessary countermeasure can be taken. Hence, inferior products can be prevented from being produced.

Incidentally, because the second embodiment has shown the case where the monitor 26 is used in combination with the image processing unit 70, turning-on of the pilot lamp 71 and/or sounding of the warning buzzer may be performed merely on the basis of the NG signal of the image processing unit 70 to draw operator's attention to the monitor 26 so that the operator can make a judgment as to whether the welding operation is to be interrupted or not. In this case, the burden imposed on the operator can be lightened because the operator need not always watch the monitor 26.

Further, in the second embodiment, the monitor 26 may be omitted so that only the image processing unit 70 is used for judging whether weld-mounting is good or not. Also in this case, instead of automatic interruption of the weld-mounting operation on the basis of the weld-mounting stop signal P, turning-on of the pilot lamp 71 and/or sounding of the warning buzzer is merely performed so that the operator can make a judgment as to whether the welding operation is to be interrupted or not.

Figure 8:
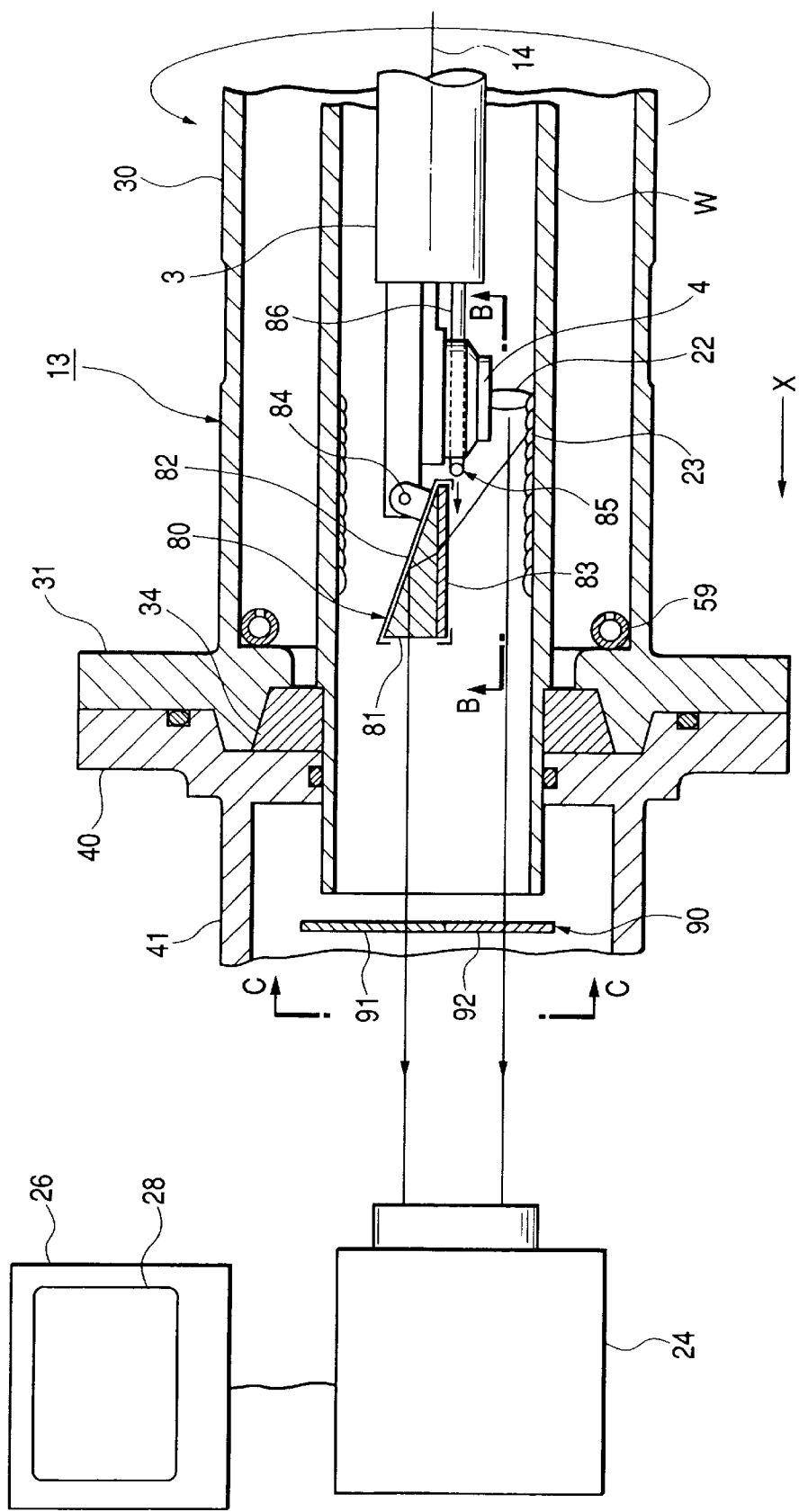
FIG. 8 is an enlarged vertical sectional view (equivalent to FIG. 2) of a main part showing a state of weld-mounting and image picking-up in a steel pipe inner surface weld-mounting apparatus showing a third embodiment of the present invention.

A third embodiment of the present invention will be described below with reference to FIGS. 8 through 10. In this embodiment, a prism-form mirror 80 is used in place of the mirror 21 in the first embodiment. Further, a mirror cooling unit 85 is provided for cooling the mirror 80. Further, a filter 90 of a special configuration interposed between the mirror 80 and the CCD camera 24 is used in place of the filter 27 attached to the front portion of the lens of the CCD camera 24 in the first embodiment. The other configuration in the third embodiment is the same as in the first embodiment.

The mirror 80 has: a prism 81 having an inclined surface (back) portion coated with a reflection film of a silver-plating layer; a casing 82 for receiving the prism 81; and a protective glass plate 83 for covering a light-receiving surface side of the prism 81. The mirror 80 is attached to the leading end portion of the arm 3 by a pivot 84 so that the tilt of the mirror 80 can be adjusted freely. The setting angle of the mirror 80, like the mirror 21 in the first embodiment, is adjusted so that the image of the weld-mounting beads 23 subjected to weld-mounting in the neighborhood of the arc light 22 of the horizontal torch 4 is reflected to be outputted horizontally.

Figure 9:
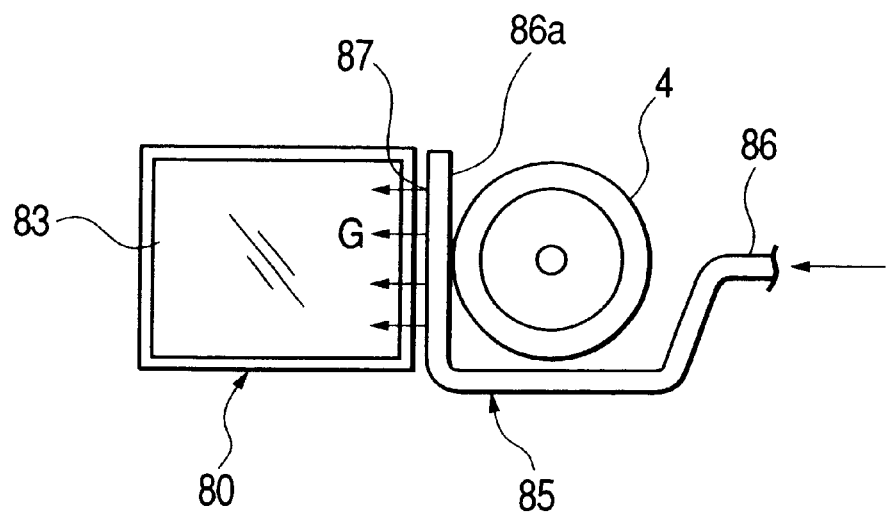
FIG. 9 is a bottom view from the arrow B—B in FIG. 8.
Figure 10:
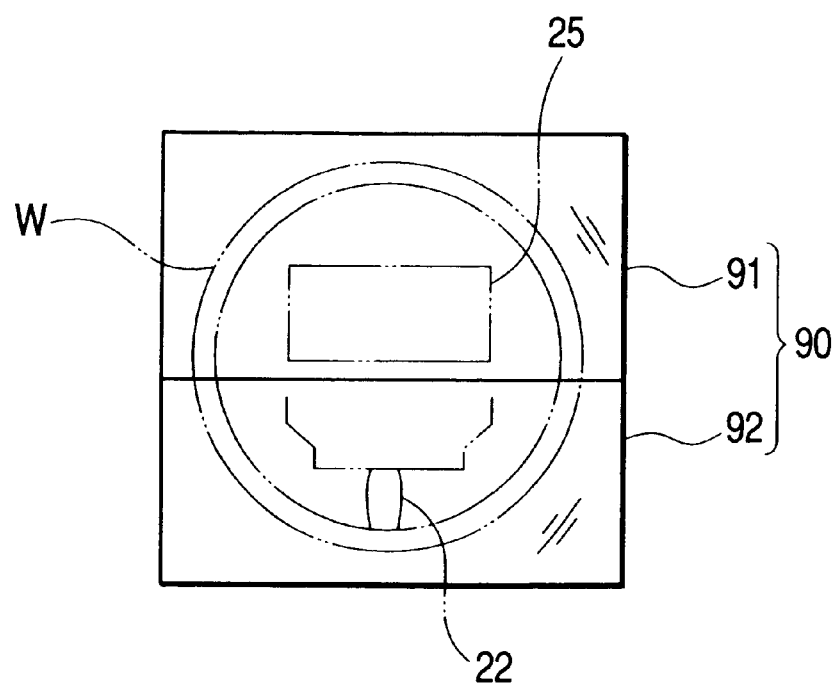
FIG. 10 is a side view from the arrow C—C in FIG. 8.

The mirror cooling unit 85 has: a cooling gas supply pipe 86 connected, through the inside of the arm 3, to an argon gas supply source not shown and provided with a leading end portion 86a bent as shown in FIG. 9; and a plurality of gas outlet ports 87 formed in the leading end portion of the cooling gas supply pipe 86. The mirror cooling unit 85 is formed so that a cooling gas (argon gas) G blown out of the gas outlet ports 87 is circulated along a surface of the protective glass plate 83.

As a result, the surface portion of the protective glass plate 83 is cooled by the cooling gas G so as to be prevented from being fogged because of melting or damaging of the protective glass plate 83 due to heat radiated from the arc light 22 and the weld-mounting metal portion. Hence, the reflected image of the weld-mounting beads 23 can be picked up, as an always sharp image, by the CCD camera 24.

Incidentally, in the case where the protective glass plate 83 is not used, configuration may be made so that the cooling gas G is circulated along the light-receiving surface of the prism 81 directly. Further, in the case where the flat plate-like mirror 21 as shown in the first embodiment is used, configuration may be made so that the cooling gas G is circulated along the surface (light-receiving surface) of the mirror 21.

Further, the filter 90 is composed of two filter components 91 and 92 fixed on the base 1 (see FIG. 1), by a support arm not shown, so as to cover an opening end portion of the steel pipe W. The attenuation factor of the lower filter 92 through which the arc light 22 passes is set to be larger than that of the upper filter 91 through which light from the weld-mounting beads 23 passes to be incident on the CCD camera 24.

As a result, the difference in brightness between the reflected image 25 of the weld-mounting beads 23 and the image of the arc light 22 on the image pick-up surface portion (image pick-up device portion) of the CCD camera 24 is reduced so that the two images can be picked up as sharp images.

The present invention is not limited to the aforementioned embodiments. Because the CCD camera 24 is used as a camera for picking an image up, the aforementioned embodiments have an advantage that the influence of noise is so low that the image processing unit 70 can perform image processing easily and that the weld-mounting operation can be recorded easily in a computer, or the like. However, any camera such as an image pick-up tube other than the CCD camera may be used. Further, in the aforementioned embodiments, the image of the weld-mounting beads 23 and the image of the arc light 22 are picked up so as to be displayed by the monitor 26 or so as to be used to make a judgment, by the image processing unit 70, as to whether the arc light is good or not. Alternatively, because the failure of the arc light 22 appears as a state of the weld-mounting beads 23, only the image of the weld-mounting beads 23 may be picked up to be monitored or to be used for a judgment as to whether the arc light is good or not. Further, any other type cooling unit such as a cooling unit having no annular support members 34 may be used as the cooling unit for circulating a cooling fluid in the outer circumferential portion of the steel pipe W. Further, the cooling unit may be omitted in the case where the steel pipe is relatively short, in the case where the quantity of heat inputted at the time of weld-mounting is small, or in like cases.

Although the aforementioned embodiments have shown the case where weld-mounting is performed while the steel pipe W is moved in the direction of the axis 14 in the condition that the horizontal torch 4 and the CCD camera 24 are disposed in fixed positions respectively, the present invention can be applied also to a steel pipe inner surface weld-mounting apparatus for performing weld-mounting while the horizontal torch is moved in the direction of the axis relative to the steel pipe rotatably supported in a predetermined position. In this case, the horizontal torch and the camera are interlockingly moved so that the distance between the mirror moved together with the horizontal torch and the camera can be kept constant.

Although the above description has been made upon the case where the metal pipe is a steel pipe, the present invention can be applied also to an apparatus for performing weld-mounting for any other metal pipe such as a copper pipe than the steel pipe.

As described above, according to the first and second aspects of the invention, the reflected image of the weld-mounting beads in the neighborhood of the arc light is displayed by the monitor. Hence, abnormality of the weld-mounting beads can be found immediately in a weld-mounting operation. Hence, a countermeasure such as inspection of the apparatus, repair by reweld-mounting, or the like, can be taken to eliminate the defects. Hence, rejected products can be prevented from being produced.

In addition to the aforementioned effect, according to the third aspect of the present invention, the reflected image of the weld-mounting beads and the image of the arc light are displayed on one and the same screen of the monitor. Hence, abnormality of the weld-mounting beads and abnormality of the arc light can be found immediately in a weld-mounting operation. Hence, a countermeasure to eliminate the defects can be taken in the same manner as described above. Hence, rejected products can be prevented from being produced.

Further, according to the fourth aspect of the invention, the image of the weld-mounting beads in the neighborhood of the arc light is picked up, as an image reflected by the mirror, by the camera so as to be used for making a judgment as to whether weld-mounting is good or not by the image processing unit on the basis of the video signal of the camera. Hence, abnormality of weld-mounting can be found immediately in a weld-mounting operation on the basis of the judgment output of the image processing unit. Hence, a countermeasure such as inspection of the apparatus, repair by reweld-mounting, or the like, can be taken to eliminate the defects. Hence, rejected products can be prevented from being produced.

In addition to the effect of the fourth aspect of the invention, according to the fifth aspect of the invention, the image processing unit makes a judgment, on the basis of the video signal of the reflected image of the weld-mounting beads and the video signal of the arc light, as to whether weld-mounting is good or not. Hence, abnormality of the weld-mounting beads and abnormality of the arc light can be found immediately in a weld-mounting operation. Hence, a countermeasure to eliminate the defects can be taken in the same manner as described above. Hence, rejected products can be prevented from being produced.

In addition to the effects of the third and fifth aspect of the invention, according to the sixth aspect of the invention, the difference in brightness between the image of the weld-mounting beads and the image of the arc light is reduced so that the two images can be picked up, as sharp images, by the camera.

In addition to the aforementioned effects, according to the seventh aspect of the invention, the metal pipe is cooled by a cooling fluid. Hence, the quantity of bending of the metal pipe due to the influence of heat is suppressed even in the case where the quantity of heat input by the arc light is large. Hence, the image reflected by the mirror can be prevented from being displaced out of the screen.

In addition to the aforementioned effects, according to the eighth aspect of the invention, the light-receiving surface portion of the mirror is cooled by a cooling gas. Hence, the light-receiving surface portion is prevented from being melted and damaged. Hence, the image of the weld-mounting beads can be picked up by the camera as an always sharp reflected image.

What is claimed is:

1. An apparatus for supporting a metal pipe extending along a horizontal axis for rotation about said horizontal axis and depositing material in a welding operation on an interior surface of said metal pipe, said apparatus including a welding monitoring device comprising:
    a horizontally extending arm having a base end and a leading end, said base end supported by said apparatus;
    a welding torch attached to a portion of said arm near said leading end and positionable on the interior of the metal pipe adjacent to the internal surface of said metal pipe, said torch axially movable along said horizontal axis with respect to said metal pipe;
    a mirror attached at the leading end of the arm;
    a camera positioned in spaced apart relation to the mirror for receiving an image of said welding operation including welding beads deposited by said torch near a vicinity of arc light generated by said horizontal torch and reflected by said mirror; and
    a monitoring device coupled to the camera for monitoring said welding operation.

2. The welding monitoring device according to claim 1, wherein the monitoring device is a monitor displaying an output video signal of the camera as an image.

3. The welding monitoring device according to claim 2, wherein the camera receives an image of the arc light and the image of the welding beads.

4. The welding monitoring device according to claim 3, further comprising a filter positioned between the mirror and the camera for attenuating the arc light received by the camera.

5. The welding monitoring device according to claim 1, wherein the monitoring device is an image processing unit for inspecting quality of the welded beads.

6. The welding monitoring device according to claim 5, wherein the camera receives an image of the arc light and the image of the welding beads.

7. The welding monitoring device according to claim 6, further comprising a filter positioned between the mirror and the camera for attenuating the arc light received by the camera.

8. The apparatus according to claim 1, further comprising a cooling unit for circulating a cooling fluid, said cooling unit mounted on said apparatus and disposed along an outer circumferential portion of the metal pipe.

9. The apparatus according to claim 1, further comprising a mirror cooling unit positioned near a light-receiving surface side of said mirror and configured to circulate a gas for cooling the light-receiving surface of the mirror.

10. The apparatus according to claim 1, wherein the metal pipe is comprised of steel.

11. The apparatus according to claim 1, wherein said apparatus is configured to move said metal pipe along said horizontal axis with respect to said torch.

12. An apparatus for supporting a metal pipe extending along a horizontal axis for rotation about said horizontal axis and depositing material in a welding operation on an interior surface of said metal pipe comprising:

a horizontally extending arm having a base end and a leading end, said base end supported by said apparatus and said leading end constituting a portion of said arm for insertion into said metal pipe;

a welding torch attached to a portion of said arm near said leading end and positionable on the interior of the metal pipe adjacent to the internal surface of said metal pipe, said torch movable axially along said horizontal axis with respect to said metal pipe;

a mirror attached at the leading end of the arm; and a camera positioned in spaced apart relation to the mirror for receiving an image of said welding operation including welding beads deposited by said torch near a vicinity of arc light generated by said horizontal torch and reflected from said mirror.

13. The apparatus according to claim 12 further including a monitoring device coupled to said camera for receiving images of said welding beads and monitoring the quality thereof.

14. The apparatus according to claim 13, wherein the monitoring device is a monitor displaying an output video signal of the camera as an image.

15. The apparatus according to claim 14, wherein the camera receives an image of the arc light and the image of the welding beads.

16. The apparatus according to claim 15, further comprising a filter positioned between the mirror and the camera for attenuating the arc light received by the camera.

17. The apparatus according to claim 12, wherein the monitoring device is an image processing unit for inspecting quality of the welded beads.

18. The apparatus according to clam 17, wherein the camera receives an image of the arc light and the image of the welding beads.

19. The apparatus according to claim 18, further comprising a filter positioned between the mirror and the camera for attenuating the arc light received by the camera.

20. The apparatus according to claim 12, further comprising a cooling unit for circulating a cooling fluid, said cooling unit mounted on said apparatus and disposed along an outer circumferential portion of the metal pipe.

21. The apparatus according to claim 12, further comprising a mirror cooling unit positioned near a light-receiving surface side of said mirror and configured to circulate a gas for cooling the light-receiving surface of the mirror.

22. The apparatus according to claim 12, wherein the metal pipe is comprised of steel.

23. The apparatus according to claim 12, wherein said apparatus is configured to move said metal pipe along said horizontal axis with respect to said torch.

* * * * *